United States Patent
Fujii et al.

(10) Patent No.: US 6,787,239 B2
(45) Date of Patent: Sep. 7, 2004

(54) ELECTRODE MATERIAL, DIELECTRIC MATERIAL AND PLASMA DISPLAY PANEL USING THEM

(75) Inventors: Toshio Fujii, Neyagawa (JP); Tatsuo Mifune, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 26 days.

(21) Appl. No.: 10/306,650

(22) Filed: Nov. 27, 2002

(65) Prior Publication Data

US 2003/0108753 A1 Jun. 12, 2003

(30) Foreign Application Priority Data

Nov. 30, 2001 (JP) ........................................ 2001-365848

(51) Int. Cl.⁷ ............................ H01B 1/00; H01B 3/00; B32B 17/06; H01J 17/49

(52) U.S. Cl. ....................... 428/427; 428/428; 428/432; 428/469; 428/689; 428/697; 428/702; 428/704; 428/325; 313/582; 313/584; 313/585; 313/586; 501/49; 501/52; 501/79; 501/153; 501/154; 252/521.3; 252/521.4; 252/519.5; 252/519.52; 252/519.54; 106/1.14; 106/1.26; 106/1.29

(58) Field of Search ................................. 313/582, 584, 313/585, 586; 428/427, 428, 432, 469, 689, 697, 702, 704, 209, 325; 501/49, 52, 79, 153, 154; 252/521.13, 521.14, 519.051, 519.52, 519.54; 106/1.14, 1.26, 1.29

(56) References Cited

U.S. PATENT DOCUMENTS 6,417,123 B1 * 7/2002 Fukushima et al. ............ 501/32
6,555,594 B1 * 4/2003 Fukushima et al. .......... 524/407

FOREIGN PATENT DOCUMENTS

| JP | 11-283508 |   | 10/1999 |            |
|----|-----------|---|---------|------------|
| JP | 2000-221671 | * | 8/2000 | ........... G03F/7/004 |
| JP | 2001-151532 | * | 6/2001 | ............. C03C/3/07 |

* cited by examiner

Primary Examiner—Deborah Jones
Assistant Examiner—Ling Xu
(74) Attorney, Agent, or Firm—Akin Gump Strauss Hauer & Feld, L.L.P.

(57) ABSTRACT

A material usable for the electrodes and the dielectric layer plasma display panels and capable of reducing the occurrence of yellowing and a high-image-quality plasma display panel using the material are provided. Using glass powder containing 25 to 50 wt % of $Bi_2O_3$, 5 to 35 wt % of $B_2O_3$, 10 to 20 wt % of ZnO, 5 to 20 wt % of BaO, 0 to 15 wt % of $SiO_2$ and 0 to 10 wt % of $Al_2O_3$, the electrodes and the dielectric layer of a plasma display panel are formed.

10 Claims, 1 Drawing Sheet

ELECTRODE MATERIAL, DIELECTRIC MATERIAL AND PLASMA DISPLAY PANEL USING THEM

BACKGROUND OF THE INVENTION

The present invention relates to a material usable for the electrodes and the dielectric layer of a plasma display panel, and to a plasma display panel using the material.

High-definition, thin and large-size plasma display panels (hereinafter, sometimes referred to as PDP) attract great attention in the fields of OA apparatuses, information displays and high-definition televisions.

Referring now to FIGS. 1 and 2, the display principle of a conventional PDP will be described. FIG. 1 is a schematic partial cross-sectional view of the surface side of the plasma display panel. FIG. 2 is a schematic partial cross-sectional view of the back side of the plasma display panel.

First, plasma is discharged between two display electrodes 3 provided on a surface glass substrate 1 serving as the display surface, thereby generating ultraviolet rays. Then, the ultraviolet rays excite a fluorescent substance 6 separated by partitions 9 on a back surface glass substrate 2, thereby generating visible light. The generated visible light passes through an MgO film 10, a surface dielectric layer 7 and the surface glass substrate 1 to be displayed as an image. This image display is performed by applying a signal to address electrodes 5 provided on the back surface glass substrate 2 and specifying which discharge cell to display. In this case, in the PDP, a plurality of linear electrodes is disposed in parallel on the surface glass substrate 1 and the back surface glass substrate 2, and the display electrodes 3 on the surface glass substrate 1 and the address electrodes 5 on the back surface glass substrate 2 are placed one on the other so that their linear electrodes are laid in the intersecting directions.

The display electrodes 3 on the surface glass substrate 1 are formed by applying a paste-like electrode material onto the substrate by a method such as screen printing, photolithography or a lift-off method and then, baking the material.

The surface dielectric layer 7 is provided for ensuring insulation between the electrodes and generating and maintaining plasma. The surface dielectric layer 7 is formed by applying a paste-like dielectric material onto the display electrodes 3 by a method such as screen printing, a bar coater method, a roll coater method, a blade coater method or a die coater method and then, drying and baking the material.

The back surface glass substrate 2 has the address electrodes 5 and a back surface dielectric layer 8 serving as the protective film for the address electrodes 5. These are formed in a similar manner to the case of the surface dielectric layer 7.

For this conventional PDP, Ag is used as the conductive metal contained in the electrodes (for example, Japanese Laid-Open Patent Publication No. H11-283508).

In this case, however, after baking is performed to obtain the electrodes, the dielectric layers and the MgO film, a phenomenon that the glass substrates or the dielectric layers are discolored yellow (yellowing) occurs, so that the image quality of the PDP is significantly degraded. In particular, the occurrence of yellowing in the surface glass substrate serving as the display surface is a serious problem. This problem is more serious for high-definition patterns of high-definition televisions and the like.

Accordingly, an object of the present invention is to solve the above-mentioned problem, that is, to provide a material usable for the electrodes and the dielectric layer of PDPs and capable of reducing the occurrence of yellowing, and a high-image-quality PDP using the material.

BRIEF SUMMARY OF THE INVENTION

The present invention provides an electrode material for a plasma display panel, comprising:

Ag powder;

glass powder containing 25 to 50 wt % of $Bi_2O_3$, 5 to 35 wt % of $B_2O_3$, 10 to 20 wt % of ZnO, 5 to 20 wt % of BaO, 0 to 15 wt % of $SiO_2$ and 0 to 10 wt % of $Al_2O_3$; and an organic component containing a resin and a solvent.

In this case, it is preferable that the glass powder has an average grain size of not more than 4.0 μm and a maximum grain size of not more than 10 μm.

Moreover, the present invention provides a dielectric material for a plasma display panel, comprising:

glass powder containing 25 to 50 wt % of $Bi_2O_3$, 5 to 35 wt % of $B_2O_3$, 10 to 20 wt % of ZnO, 5 to 20 wt % of BaO, 0 to 15 wt % of $SiO_2$ and 0 to 10 wt % of $Al_2O_3$; and an organic component containing a resin and a solvent.

In this case, it is preferable that the glass powder contains 25 to 40 wt % of $Bi_2O_3$, 15 to 35 wt % of $B_2O_3$, 10 to 20 wt % of ZnO, 10 to 20 wt % of BaO, 0 to 10 wt % of $SiO_2$ and 0 to 10 wt % of $Al_2O_3$.

Moreover, it is preferable that the glass powder further contains 0.1 to 2 wt % of CuO.

Further, the present invention provides a plasma display panel comprising:

a plurality of electrodes comprising a first glass and Ag; and a dielectric layer comprising a second glass and insulating the electrodes from each other, wherein at least one of the first glass and the second glass contains 25 to 50 wt % of $Bi_2O_3$, 5 to 35 wt % of $B_2O_3$, 10 to 20 wt % of ZnO, 5 to 20 wt % of BaO, 0 to 15 wt % of $SiO_2$ and 0 to 10 wt % of $Al_2O_3$.

In this case, it is preferable that the second glass contains 15 to 35 wt % of $B_2O_3$.

Moreover, it is preferable that the second glass further contains 0.1 to 2 wt % of CuO.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

(1) Electrode Paste for PDPs

Figure 1:
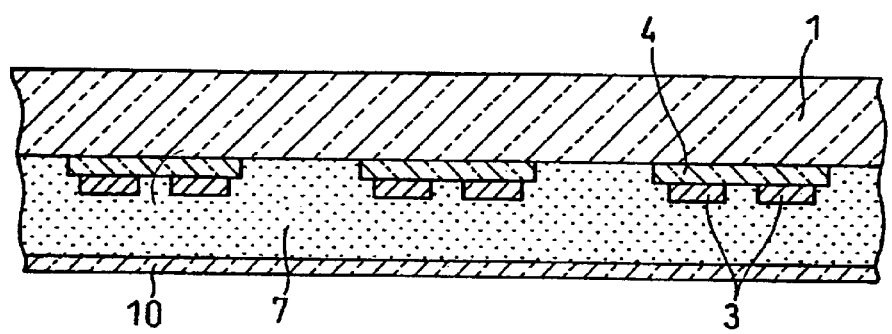
FIG. 1 is a schematic cross-sectional view of the surface side of the plasma display panel.
Figure 2:
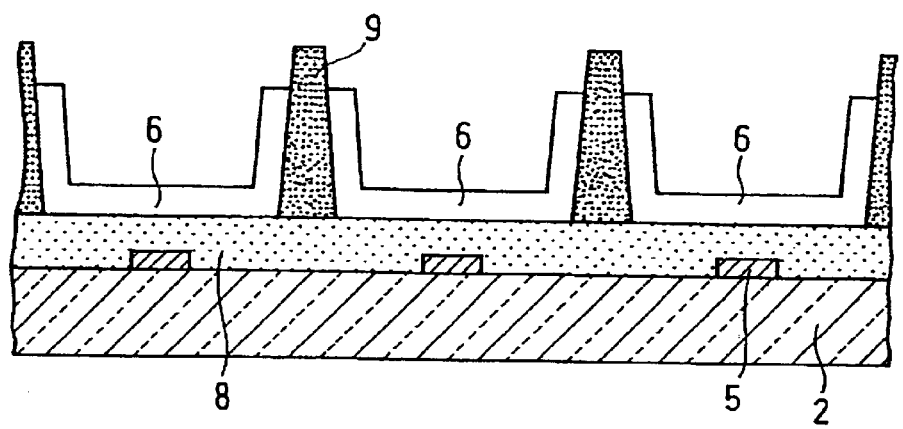
FIG. 2 is a schematic cross-sectional view of the back surface side of the plasma display panel.

An electrode material for PDPs according to the present invention comprises: Ag powder; glass powder containing 25 to 50 wt % of $Bi_2O_3$, 5 to 35 wt % of $B_2O_3$, 10 to 20 wt % of ZnO, 5 to 20 wt % of BaO, 0 to 15 wt % of $SiO_2$ and 0 to 10 wt % of $Al_2O_3$; and an organic component containing a resin and a solvent.

Examples of the Ag powder include AG-4-8 and AG-5-7 manufactured by Dowa Mining Co., Ltd. and SPQ08S manufactured by Mitsui Mining and Smelting Co., Ltd.

As for the grain size of the Ag powder, it is desirable that the average grain size be 1 to 5 μm and the maximum grain size be not more than 20 μm.

The glass powder contains as essential components, expressed on an oxide basis, 25 to 50 wt % of $Bi_2O_3$, 5 to 35 wt % of $B_2O_3$, 10 to 20 wt % of ZnO and 5 to 20 wt % of BaO, and contains as optional components 0 to 15 wt % of $SiO_2$ and 0 to 10 wt % of $AL_2O_3$.

Conditions required of the glass powder used for the electrodes of PDPs include low reactivity with Ag contained in the electrodes, an appropriate thermal expansion coefficient for excellent matching with the glass substrate, and bakeable temperature of 500 to 600° C. which is higher than that of the dielectric layer and the MgO film.

Examples of the glass powder used for the conventional PDP include a lead base glass containing $PbO_2$, $B_2O_3$ and $SiO_2$, and a lead base YFT340 (manufactured by Asahi Glass Co., Ltd.) containing $PbO_2$, $B_2O_3$, $SiO_2$, $Al_2O_3$, BaO and CuO. These have a problem that yellowing occurs between the glass substrate and the Ag electrodes and between the dielectric layer and the Ag electrodes.

In an attempt to solve this problem, the inventors have found that the above-mentioned conditions are satisfied and the occurrence of yellowing when the glass powder is used as the electrode material for PDPs is reduced by adjusting the quantity of $Bi_2O_3$ and $B_2O_3$ in the glass containing $Bi_2O_3$ as a main component, and this lead to the completion of the present invention.

It is desirable that the quantity of $Bi_2O_3$ be 25 to 50 wt %. This is because the thermal expansion coefficient is too high and the softening point is too low when the quantity of $Bi_2O_3$ is too large. It is more desirable that the quantity of $Bi_2O_3$ be 30 to 45 wt %.

It is desirable that the quantity of $B_2O_3$ forming the glass skeleton be 5 to 35 wt %. This is because the thermal expansion coefficient is too low and the softening point is too high when the quantity of $B_2O_3$ is too large. It is more desirable that the quantity of $B_2O_3$ be 5 to 30 wt %.

It is desirable that the quantity of ZnO be 10 to 20 wt %. This is because the thermal expansion coefficient is too high and transparency is decreased when the quantity of ZnO is too large.

It is desirable that the quantity of BaO be 5 to 20 wt %. This is because the softening point is too high when the quantity of BaO is too large.

It is desirable that the quantity of $SiO_2$ which is an optional component forming the glass skeleton be 0 to 15 wt %. This is because the softening point is too high when the quantity of $SiO_2$ is too large. The quantity of BaO is preferably 5 to 12 wt %, further preferably 7 to 10 wt %.

It is desirable that the quantity of $Al_2O_3$ which is the other optical component be 0 to 10 wt %. This is because the softening point is too high when the quantity of $Al_2O_3$ is too large. The quantity of $Al_2O_3$ is preferably 2 to 8 wt %, and further preferably 5 to 7 wt %.

It is desirable that the average grain size of the glass powder be not more than 4.0 μm. This is because this improves the bindability between the Ag electrodes and the glass substrate. It is more desirable that the average grain size of the glass powder be 1 to 3 μm.

It is desirable that the maximum grain size of the glass powder be not more than 10 μm. This is because this realizes binding power and the edge straightness of the Ag electrodes in good balance. It is more desirable that the maximum grain size of the glass powder be 5 to 8 μm.

Next, the organic component contained in the electrode material according to the present invention will be described.

The organic component includes a solvent and a resin (binder).

Examples of the solvent include: terpenes such as α-, β- and γ-terpineols; ethylene glycol monoalkyl ethers; ethylene glycol dialkyl ethers; diethylene glycol monoalkyl ethers; diethylene glycol dialkyl ethers; ethylene glycol monoalkyl ether acetates; ethylene glycol dialkyl ether acetates; diethylene glycol monoalkyl ether acetates; diethylene glycol dialkyl ether acetates; propylene glycol monoalkyl ethers; propylene glycol dialkyl ethers; propylene glycol monoalkyl ether acetates; propylene glycol dialkyl ether acetates; and alcohols such as methanol, ethanol, isopropanol and 1-butanol. These may be used alone or in a combination of two or more kinds.

Examples of the resin include: cellulosic resins such as cellulose nitrate, ethyl cellulose and hydroxyethyl cellulose; acrylate resins such as polybutyl acrylate and polymethacrylate; acrylic copolymer; polyvinyl alcohol; and poplyvinyl butyral. These may be used alone or in a combination of two or more kinds.

To the electrode material according to the present invention, additives such as a dispersant, an elasticizer, a viscosity improver, an oligomer, a polymer, an ultraviolet absorbent, a photosensitive monomer, a photo polymerization initiator and a sensitizer may be added as required within the bounds of not harming the effects of the present invention.

As for the mixture ratio (weight ratio) among the Ag, the glass powder, the solvent and the resin in the electrode material according to the present invention, it is desirable that Ag:glass powder:solvent:resin be 60–70:2–5:15–20:10–15 (100 in total). It is particularly desirable that Ag:glass powder:solvent:resin be 67:3:18:12.

The electrode material according to the present invention is obtained by mixing and dispersing these components by using a dispersing apparatus such as three rollers, a ball mill or a sand mill.

To form the electrodes in PDPs, the electrode material obtained in the above-described manner is applied onto a glass substrate by using a method such as screen printing, photolithography or the lift-off method. As for the drying and the baking, one of ordinary skill in the art can properly perform them based on the prior art.

(2) Dielectric Paste for PDPs

A dielectric material for PDPs according to the present invention comprises: glass powder containing 25 to 50 wt % of $Bi_2O_3$, 5 to 35 wt % of $B_2O_3$, 10 to 20 wt % of ZnO, 5 to 20 wt % of BaO, 0 to 15 wt % of $SiO_2$ and 0 to 10 wt % of $Al_2O_3$; and an organic component containing a resin and a solvent.

The glass powder contains as essential components 25 to 50 wt % of $Bi_2O_3$, 5 to 35 wt % of $B_2O_3$, 10 to 20 wt % of ZnO and 5 to 20 wt % of BaO, and contains as optional components 0 to 15 wt % of $SiO_2$ and 0 to 10 wt % of $Al_2O_3$.

Conditions required of the glass powder used for the dielectric of PDPs include excellent light transmittance, an optimum dielectric constant, an optimum thermal expansivity so as to prevent a fracture of the dielectric itself and a fracture of the substrate, and an optimum softening point so that baking can be performed at a constant temperature.

As described above, the inventors, who have found an optimum electrode material for PDPs, have also found that the glass powder used for the electrode material can be suitably used also for the dielectric of PDPS.

The composition of the glass powder used for the dielectric material may be the same as that of the glass powder used for the electrode material. However, from the viewpoint of suppressing yellowing, it is desirable that the content of $B_2O_3$ be 15 to 35 wt %. Moreover, since high light transmittance is to be obtained, it is desirable that the content of BaO be 10 to 20 wt %.

The average grain size and the maximum grain size of the glass powder and the organic component contained in the dielectric material may be the same as those of the above-mentioned electrode material.

However, it is desirable not to add additives such as a dispersant, an elasticizer, a viscosity improver, an oligomer, a polymer, an ultraviolet absorbent, a photosensitive monomer, a photo polymerization initiator and a sensitizer if possible. This is because addition of additives hinders the sintering of the glass.

As for the mixture ratio (weight ratio) among the glass powder, the solvent and the resin in the dielectric material according to the present invention, it is desirable that glass powder:solvent:resin be 60–70:2–7:25–35 (100 in total). It is particularly desirable that glass powder:solvent:resin be 65:5:30.

The dielectric material according to the present invention is obtained by mixing and dispersing these components by a method similar to that by which the electrode material is obtained.

To form the dielectric layer in PDPs, the dielectric material obtained in the above-described manner is applied by a method such as screen printing, the bar coater method, the roll coater method, the blade coater method or the die coater method. The conditions for the drying and the baking may be the same as those for the prior art.

(3) Plasma Display Panel (PDP)

The present invention also relates to a plasma display panel (PDP) having at least one of an electrode formed by using the above-mentioned electrode material and a dielectric layer formed by using the above-mentioned dielectric material.

That is, the present invention provides a plasma display panel comprising at least one of: a plurality of electrodes comprising a first glass and Ag; and a dielectric layer comprising a second glass and insulating the electrodes from each other. At least one of the first glass and the second glass contains 25 to 50 wt % of $Bi_2O_3$, 5 to 35 wt % of $B_2O_3$, 10 to 20 wt % of ZnO, 5 to 20 wt % of BaO, 0 to 15 wt % of $SiO_2$ and 0 to 10 wt % of $Al_2O_3$.

It is desirable that the second glass contain 15 to 35 wt % of $B_2O_3$. It is desirable that the second glass further contain 0.1 to 2 wt % of CuO.

While various structures are employed for PDPs, the structure of the PDP according to the present invention characterized in the use of the above-described electrode material and dielectric material is not specifically limited. For example, the structures shown in FIG. 1 and are used.

As the method of forming the electrodes and the dielectric layer, a method known in the prior art is used as described above.

As the glass substrate where the electrodes and the dielectric layer are formed, for example, PP8 manufactured by Nippon Electric Glass Co., Ltd. is used.

Hereinafter, the present invention will be described in more detail with reference to examples. However, the present invention is not limited thereto.

EXPERIMENTAL EXAMPLE 1

Electrode Paste

Ethyl cellulose being the resin and α-terpineol being the solvent were mixed at a mixture weight ratio of 4:6 while stirring, thereby preparing a solution containing the organic component. Then, the solution, Ag powder and glass powder (average grain size: 1.5 μm; maximum grain size: 4.5 μm) having a composition shown in TABLE 1 were mixed at a weight ratio of 30:3:67, and were mixed and dispersed with three rollers, thereby preparing an electrode material.
[Evaluation]

(i) To form film electrodes where no pattern was formed, the electrode material obtained in the above-described manner was applied onto a glass substrate (PP8 manufactured by Nippon Electric Glass Co., Ltd.) by the blade coater method, held at 90° C. for 30 minutes to be dried, and then, baked at 580° C. for ten minutes. The obtained electrodes were 10 μm in thickness.

The bonding strength of the electrodes was evaluated by the crosscut method (JIS K5600-5-6). In this evaluation, cases where the cut end was smooth and there was no exfoliation in any lattice cell were regarded as acceptable.

(ii) The electrode material obtained in the above-described manner was applied onto a glass substrate (PP8 manufactured by Nippon Electric Glass Co., Ltd.) by screen printing, held at 90° C. for 30 minutes to be dried, and then, baked at 590° C. for ten minutes. The obtained electrodes were 10 μm in thickness.

A "b" value representing the degree of coloring of the glass substrate was measured by using a colorimeter. Regarding as the degree of yellowing the value obtained by subtracting the "b" value of Ag itself and the "b" value of the glass substrate itself from the obtained "b" value, the degree of coloring of the glass substrate was evaluated. Since hardly any yellowing is observed in the glass substrate when the degree of yellowing is not more than 1.5, cases where the degree of yellowing was not more than 1.5 were regarded as acceptable. The degree of yellowing referred to here is evaluation for the Ag electrodes.

As the overall evaluation, cases where there was no exfoliation and the degree of yellowing was not more than 1.5 were regarded as acceptable and are marked with ○. Other cases are marked with X. The results are shown in TABLE 1.

TABLE 1

|  |  | 1 | 2 | 3 | 4 | 5 | 6 | 7 | 8 | 9 | 10 |
|---|---|---|---|---|---|---|---|---|---|---|---|
| Glass powder (wt %) | $Bi_2O_3$ | 50 | 45 | 40 | 38 | 30 | 25 | 60 | 20 | 20 | 55 |
|  | $B_2O_3$ | 5 | 12 | 20 | 18 | 30 | 35 | 15 | 35 | 40 | 2 |
|  | ZnO | 10 | 17 | 20 | 10 | 15 | 18 | 10 | 7 | 15 | 25 |
|  | BaO | 20 | 9 | 12 | 20 | 15 | 5 | 10 | 15 | 15 | 3 |
|  | $SiO_2$ | 15 | 12 | 0 | 10 | 5 | 7 | 5 | 10 | 5 | 12 |
|  | $Al_2O_3$ | 0 | 5 | 8 | 4 | 5 | 10 | 0 | 13 | 5 | 3 |

TABLE 1-continued

|  | 1 | 2 | 3 | 4 | 5 | 6 | 7 | 8 | 9 | 10 |
|---|---|---|---|---|---|---|---|---|---|---|
| Average grain size ($\mu$m) | 1.5 | 1.5 | 1.5 | 1.5 | 1.5 | 1.5 | 1.5 | 1.5 | 1.5 | 1.5 |
| Maximum grain size ($\mu$m) | 4.5 | 4.5 | 4.5 | 4.5 | 4.5 | 4.5 | 4.5 | 4.5 | 4.5 | 4.5 |
| Bonding strength *1 | No | No | No | No | No | No | Yes | Yes | No | No |
| Degree of yellowing | 0.90 | 0.85 | 0.85 | 0.90 | 0.85 | 0.95 | 0.30 | 0.25 | 4.50 | 4.00 |
| Evaluation | ○ | ○ | ○ | ○ | ○ | ○ | X | X | X | X |

*1 No: No exfoliation is observed.
Yes: Exfoliation is observed.

As is apparent from TABLE 1, by using as the glass contained in the electrodes a glass containing, expressed on an oxide basis, 25 to 50 wt % of $Bi_2O_3$, 5 to 35 wt % of $B_2O_3$, 10 to 20 wt % of ZnO, 5 to 20 wt % of BaO, 0 to 15 wt % of $SiO_2$ and 0 to 10 wt % of $Al_2O_3$, electrodes are formed having high strength of bonding to the glass substrate and where little yellowing occurs in the panel.

EXPERIMENTAL EXAMPLE 2

Electrode Paste

An electrode material was prepared in a similar manner to that of the above Experimental Example 1 except that glass powder having the composition, the average grain size and the maximum grain size shown in TABLE 2 was used, and the bonding strength and the degree of yellowing were evaluated in a similar manner. The results are shown in TABLE 2.

TABLE 2

|  |  | 1 | 2 | 3 | 4 | 5 | 6 | 7 | 8 | 9 | 10 |
|---|---|---|---|---|---|---|---|---|---|---|---|
| Glass powder (wt %) | $Bi_2O_3$ | 50 | 50 | 50 | 50 | 50 | 50 | 50 | 50 | 50 | 50 |
|  | $B_2O_3$ | 5 | 5 | 5 | 5 | 5 | 5 | 5 | 5 | 5 | 5 |
|  | ZnO | 10 | 10 | 10 | 10 | 10 | 10 | 10 | 10 | 10 | 10 |
|  | BaO | 20 | 20 | 20 | 20 | 20 | 20 | 20 | 20 | 20 | 20 |
|  | $SiO_2$ | 15 | 15 | 15 | 15 | 15 | 15 | 15 | 15 | 15 | 15 |
|  | $Al_2O_3$ | 0 | 0 | 0 | 0 | 0 | 0 | 0 | 0 | 0 | 0 |
| Average grain size ($\mu$m) |  | 1.0 | 1.5 | 3.0 | 4.0 | 5.0 | 10.0 | 2.0 | 3.0 | 4.5 | 6.0 |
| Maximum grain size ($\mu$m) |  | 3.0 | 4.5 | 5.0 | 10.0 | 15.0 | 30.0 | 15.0 | 20.0 | 7.0 | 8.0 |
| Bonding strength |  | No | No | No | No | Yes | Yes | Yes | Yes | Yes | Yes |
| Degree of yellowing |  | 0.90 | 0.95 | 0.85 | 0.90 | 0.30 | 0.30 | 0.30 | 0.35 | 0.40 | 0.45 |
| Evaluation |  | ○ | ○ | ○ | ○ | X | X | X | X | X | X |

*1 No: No exfoliation is observed.
Yes: Exfoliation is observed.

As is apparent from TABLE 2, when the average grain size of the glass powder contained in the electrode material was not more than 4.0 $\mu$m and the maximum grain size thereof was not more than 10 $\mu$m, the strength of bonding between the formed electrodes and the glass substrate was high and the occurrence of yellowing in the PDP was reduced.

EXPERIMENTAL EXAMPLE 3

Dielectric Paste

Ethyl cellulose being the resin and á-terpineol being the solvent were mixed at a mixture weight ratio of 5:30 while stirring, thereby preparing a solution containing the organic component. Then, the solution and glass powder (the average grain size 2 $\mu$m, the maximum grain size 8 $\mu$m) having a composition shown in TABLEs 3 and 4 were mixed at a weight ratio of 65:35, and were mixed and dispersed with three rollers, thereby preparing a dielectric material.

[Evaluation]

(i) The dielectric material obtained in the above-described manner is applied by the blade coater method onto a glass substrate having the electrodes formed by using the electrode material according to the present invention, held at 90° C. for 30 minutes to be dried, and then, baked at 580° C. for ten minutes. The obtained dielectric layer was 40 $\mu$m in thickness.

A "b" value representing the degree of coloring of the glass substrate was measured by using a calorimeter. Regarding as the degree of yellowing the value obtained by subtracting the "b" value of Ag itself and the "b" value of the glass substrate itself from the obtained "b" value, the degree of coloring of the glass substrate was evaluated. Since hardly any yellowing is observed in the glass substrate when the degree of yellowing is not more than 1.5, cases where the degree of yellowing was not more than 1.5 were regarded as acceptable. The degree of yellowing referred to here is evaluation for the dielectric layer formed on the Ag electrodes.

(ii) The electrode material obtained in the above-described manner was applied by the blade coater method onto a glass substrate (PP8 manufactured by Nippon Electric Glass Co., Ltd.) having no electrode, held at 90° C. for 30 minutes to be dried, and then, baked at 580° C. for ten minutes. The obtained electrodes were 40 $\mu$m in thickness.

The total light transmittance (wavelength=550 nm) of the dielectric layer was measured. It is considered that, to achieve high brightness and high image quality in high-definition patterns such as those of high-definition televisions, it is necessary that the total light transmittance be not less than 85% in the case of VGA and not less than 90% in the case of XGA (according to the company standard of Matsushita Electric Industrial Co., Ltd.). Therefore, in this example, cases where the total light transmittance was not less than 85% were regarded as acceptable.

As the overall evaluation, cases where the degree of yellowing was not more than 1.5 and the total light transmittance was not less than 85% were regarded as acceptable and are marked with ○. Other cases are marked with X. Cases where at least one of the conditions that the degree of yellowing was not more than 1.2 and the total light transmittance was not less than 90% was satisfied are marked with ⊙ these cases exhibit particularly excellent performance among the cases marked with ○. The results are shown in TABLEs 3 and 4.

Further, by using as the glass for the dielectric layer a glass containing, expressed on an oxide basis, 25 to 40 wt % of $Bi_2O_3$, 15 to 35 wt % of $B_2O_3$, 10 to 20 wt % of ZnO, 10 to 20 wt % of BaO, 0 to 10 wt % of $SiO_2$ and 0 to 10 wt % of $Al_2O_3$, a PDP with little yellowing and high transmittance is obtained.

Moreover, by adding, expressed on an oxide basis, 0.1 to 2 wt % of CuO to the glass contained in the dielectric layer, a PDP with less yellowing and high transmittance is obtained.

According to the present invention, a material usable for the electrodes and the dielectric layer of PDPs and capable of reducing the occurrence of yellowing, and a high-brightness and high-image-quality PDP using the material are provided.

TABLE 3

| | | | 1 | 2 | 3 | 4 | 5 | 6 | 7 | 8 | 9 | 10 | 11 |
|---|---|---|---|---|---|---|---|---|---|---|---|---|---|
| Ag electrodes | Glass powder (wt %) | $Bi_2O_3$ | 50 | 50 | 50 | 50 | 50 | 50 | 50 | 50 | 50 | 50 | 50 |
| | | $B_2O_3$ | 5 | 5 | 5 | 5 | 5 | 5 | 5 | 5 | 5 | 5 | 5 |
| | | ZnO | 10 | 10 | 10 | 10 | 10 | 10 | 10 | 10 | 10 | 10 | 10 |
| | | BaO | 20 | 20 | 20 | 20 | 20 | 20 | 20 | 20 | 20 | 20 | 20 |
| | | $SiO_2$ | 15 | 15 | 15 | 15 | 15 | 15 | 15 | 15 | 15 | 15 | 15 |
| | | $Al_2O_3$ | 0 | 0 | 0 | 0 | 0 | 0 | 0 | 0 | 0 | 0 | 0 |
| Dielectric Layers | Glass powder (wt %) | $Bi_2O_3$ | 50 | 50 | 48 | 45 | 43 | 40 | 40 | 38 | 33 | 30 | 27 |
| | | $B_2O_3$ | 10 | 5 | 15 | 12 | 8 | 15 | 15 | 18 | 25 | 30 | 33 |
| | | ZnO | 15 | 20 | 10 | 17 | 18 | 20 | 15 | 10 | 17 | 15 | 18 |
| | | BaO | 10 | 10 | 8 | 9 | 9 | 5 | 20 | 20 | 15 | 15 | 10 |
| | | $SiO_2$ | 15 | 15 | 12 | 12 | 12 | 10 | 10 | 10 | 5 | 5 | 2 |
| | | $Al_2O_3$ | 0 | 0 | 7 | 5 | 10 | 10 | 0 | 4 | 5 | 5 | 10 |
| | | CuO | 0 | 0 | 0 | 0 | 0 | 0 | 0 | 0 | 0 | 0 | 0 |
| Degree of yellowing | | | 1.4 | 1.30 | 1.35 | 1.30 | 1.35 | 1.30 | 1.30 | 1.35 | 1.30 | 1.40 | 1.35 |
| Total light transmittance (%) | | | 85 | 85 | 86 | 85 | 85 | 86 | 90 | 90 | 90 | 90 | 91 |
| Evaluation | | | ○ | ○ | ○ | ○ | ○ | ○ | ⊙ | ⊙ | ⊙ | ⊙ | ⊙ |

*1 No: No exfoliation is observed.
Yes: Exfoliation is observed.

TABLE 4

| | | | 12 | 13 | 14 | 15 | 16 | 17 | 18 | 19 | 20 | 21 | 22 |
|---|---|---|---|---|---|---|---|---|---|---|---|---|---|
| Ag electrodes | Glass powder (wt %) | $Bi_2O_3$ | 50 | 50 | 50 | 50 | 50 | 50 | 50 | 50 | 50 | 50 | 50 |
| | | $B_2O_3$ | 5 | 5 | 5 | 5 | 5 | 5 | 5 | 5 | 5 | 5 | 5 |
| | | ZnO | 10 | 10 | 10 | 10 | 10 | 10 | 10 | 10 | 10 | 10 | 10 |
| | | BaO | 20 | 20 | 20 | 20 | 20 | 20 | 20 | 20 | 20 | 20 | 20 |
| | | $SiO_2$ | 15 | 15 | 15 | 15 | 15 | 15 | 15 | 15 | 15 | 15 | 15 |
| | | $Al_2O_3$ | 0 | 0 | 0 | 0 | 0 | 0 | 0 | 0 | 0 | 0 | 0 |
| Dielectric Layers | Glass powder (wt %) | $Bi_2O_3$ | 25 | 50 | 48 | 40 | 40 | 38 | 25 | 15 | 20 | 55 | 60 |
| | | $B_2O_3$ | 35 | 5 | 13 | 15 | 15 | 18 | 35 | 45 | 40 | 3 | 0 |
| | | ZnO | 20 | 19 | 10 | 20 | 14 | 10 | 20 | 8 | 7 | 22 | 25 |
| | | BaO | 10 | 10 | 8 | 5 | 20 | 20 | 10 | 15 | 5 | 10 | 3 |
| | | $SiO_2$ | 0 | 15 | 12 | 10 | 10 | 8 | 0 | 5 | 20 | 10 | 1 |
| | | $Al_2O_3$ | 10 | 0 | 7 | 10 | 0 | 4 | 10 | 12 | 8 | 0 | 11 |
| | | CuO | 0 | 1 | 2 | 0.1 | 1 | 2 | 0.1 | 0 | 0 | 0 | 0 |
| Degree of yellowing | | | 1.40 | 1.10 | 1.05 | 1.10 | 1.10 | 1.05 | 1.15 | 1.40 | 1.45 | 1.35 | 1.45 |
| Total light transmittance (%) | | | 91 | 85 | 85 | 86 | 90 | 90 | 91 | 81 | 80 | 80 | 81 |
| Evaluation | | | ⊙ | ⊙ | ⊙ | ⊙ | ⊙ | ⊙ | ⊙ | X | X | X | X |

*1 No: No exfoliation is observed.
Yes: Exfoliation is observed.

As is apparent from TABLEs 3 and 4, by using the glass substrate having the electrodes, and using as the glass for the dielectric layer the glass containing, expressed on an oxide basis, 25 to 50 wt % of $Bi_2O_3$, 5 to 35 wt % of $B_2O_3$, 10 to 20 wt % of ZnO, 5 to 20 wt % of BaO, 0 to 15 wt % of $SiO_2$ and 0 to 10 wt % of $Al_2O_3$, a PDP with little yellowing is obtained.

Although the present invention has been described in terms of the presently preferred embodiments, it is to be understood that such disclosure is not to be interpreted as limiting. Various alterations and modifications will no doubt become apparent to those skilled in the art to which the present invention pertains. after having read the above disclosure. Accordingly, it is intended that the appended claims be interpreted as covering all alterations and modifications as fall within the true spirit and scope of the invention.

What is claimed is:

1. An electrode material for a plasma display panel, comprising:

Ag powder;

glass powder containing 25 to 50 wt % of $Bi_2O_3$, 5 to 35 wt % of $B_2O_3$, 10 to 20 wt % of ZnO, 5 to 20 wt % of BaO, 0 to 15 wt % of $SiO_2$ and 0 to 10 wt % of $Al_2O_3$; wherein said glass powder has an average grain size of not more than 4.0 μm and a maximum grain size of not more than 10 μm; and an organic component containing a resin and a solvent.

2. A dielectric material for a plasma display panel, comprising:

glass powder containing 25 to 50 wt % of $Bi_2O_3$, 5 to 35 wt % of $B_2O_3$, 10 to 20 wt % of ZnO, 5 to 20 wt % of BaO, 0 to 15 wt % of $SiO_2$ and 0 to 10 wt % of $Al_2O_3$; wherein said glass powder has an average grain size of not more than 4.0 μm and a maximum grain size of not more than 10 μm; and an organic component containing a resin and a solvent.

3. The dielectric material for a plasma display panel in accordance with claim 2, wherein said glass powder contains 25 to 40 wt % of $Bi_2O_3$, 15 to 35 wt % of $B_2O_3$, 10 to 20 wt % of ZnO, 10 to 20 wt % of BaO, 0 to 10 wt % of $SiO_2$ and 0 to 10 wt % of $Al_2O_3$.

4. The dielectric material for a plasma display panel in accordance with claim 2, wherein said glass powder further contains 0.1 to 2 wt % of CuO.

5. A plasma display panel comprising:

a plurality of electrodes comprising a first glass and Ag; and a dielectric layer comprising a second glass and insulating said electrodes from each other, wherein at least one of said first glass and said second glass contains 25 to 50 wt % of $Bi_2O_3$, 5 to 35 wt % of $B_2O_3$, 10 to 20 wt % of ZnO, 5 to 20 wt % of BaO, 0 to 15 wt % of $SiO_2$ and 0 to 10 wt % of $Al_2O_3$; and wherein said at least one of said first glass and said second glass is made from a glass powder having an average grain size of not more than 4.0 μm and a maximum grain size of not more than 10 μm.

6. The plasma display panel in accordance with claim 5, wherein said second glass contains 15 to 35 wt % of $B_2O_3$.

7. The plasma display panel in accordance with claim 5, wherein said second glass further contains 0.1 to 2 wt % of CuO.

8. A plasma display panel comprising a dielectric layer made of a dielectric paste material comprising:

glass powder containing 25 to 50 wt % of $Bi_2O_3$, 5 to 35 wt % of $B_2O_3$, 10 to 20 wt % of ZnO, 5 to 20 wt % of BaO, 0 to 15 wt % of $SiO_2$, and 0 to 10 wt % of $Al_2O_3$; and an organic component containing at least a resin and a solvent, wherein said glass powder has an average grain size of not more than 4.0 μm and a maximum grain size of not more than 10 μm.

9. The plasma display panel in accordance with claim 8, wherein said glass powder contains 15 to 35 wt % of $B_2O_3$.

10. The plasma display panel in accordance with claim 8, wherein said glass powder further contains 0.1 to 2 wt % of CuO.

* * * * *